United States Patent
Jiang et al.

(10) Patent No.: US 7,272,209 B2
(45) Date of Patent: Sep. 18, 2007

(54) AUTOMATED DSL PERFORMANCE ADJUSTMENT

(75) Inventors: Baofeng Frank Jiang, Pleasanton, CA (US); Xidong Wu, Livermore, CA (US); Jim Tadashi Otsuka, San Jose, CA (US); John Porter Van Slyke, Lafayette, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 691 days.

(21) Appl. No.: 10/761,123

(22) Filed: Jan. 20, 2004

(65) Prior Publication Data

US 2005/0163286 A1  Jul. 28, 2005

(51) Int. Cl.
*H04M 1/24* (2006.01)
*H04M 3/08* (2006.01)
*H04M 3/22* (2006.01)

(52) U.S. Cl. .................. 379/1.04; 379/1.03; 379/24; 379/29.09

(58) Field of Classification Search ............... 379/1.01, 379/1.03, 1.04, 9.02, 15.03, 22, 24, 26.01, 379/27.04, 28, 29.09
See application file for complete search history.

(56) References Cited

U.S. PATENT DOCUMENTS

| | | | |
|---|---|---|---|
| 5,751,338 | A | 5/1998 | Ludwig, Jr. |
| 5,974,139 | A | 10/1999 | McNamara et al. |
| 5,987,061 | A | 11/1999 | Chen |
| 6,044,107 | A | 3/2000 | Gatherer et al. |
| 6,055,268 | A | 4/2000 | Timm et al. |
| 6,081,291 | A | 6/2000 | Ludwig, Jr. |
| 6,292,559 | B1 | 9/2001 | Gaikwad et al. |
| 6,317,495 | B1 | 11/2001 | Gaikwad et al. |
| 6,424,657 | B1 | 7/2002 | Voit et al. |
| 6,466,088 | B1 | 10/2002 | Rezvani et al. |
| 6,467,092 | B1 | 10/2002 | Geile et al. |
| 6,477,238 | B1 | 11/2002 | Schneider et al. |
| 6,498,791 | B2 | 12/2002 | Pickett et al. |
| 6,507,606 | B2 | 1/2003 | Shenoi et al. |
| 6,532,277 | B2 | 3/2003 | Ulanskas et al. |
| 6,538,451 | B1 | 3/2003 | Galli et al. |
| 6,549,568 | B1 | 4/2003 | Bingel |

(Continued)

OTHER PUBLICATIONS

International Telecommunication Union, "Series G:Transmission Systems and Media, Digital Systems and Networks. Digital Sections and Digital Line System-Access Networks. Asymetric Digital Subscriber Line (ADSL) Transceivers- 2(ADSL2)," G.992.3, ITU-T, Jul. 2002, pp. 1-127.

*Primary Examiner*—Quoc Tran
(74) *Attorney, Agent, or Firm*—Toler Schaffer, LLP

(57) ABSTRACT

The present application discloses an automated digital subscriber line performance control system comprising a computer system including a logic module to evaluate performance of a plurality of DSL lines and to automatically select a set of DSL lines from the plurality of DSL lines, a line profile database responsive to the computer system, the line profile database providing a plurality of line profiles in response to a request from the computer system, and a digital subscriber line access multiplexer coupled to the computer system. The digital subscriber line access multiplexer is configured to measure a performance parameter of a plurality of physical DSL lines and to change a profile for at least one of the plurality of DSL lines. The set of DSL lines has degraded performance characteristics based on historical performance data.

23 Claims, 3 Drawing Sheets

U.S. PATENT DOCUMENTS

| | | |
|---|---|---|
| 6,570,855 B1 | 5/2003 | Kung et al. |
| 6,597,689 B1 | 7/2003 | Chiu et al. |
| 6,608,835 B2 | 8/2003 | Geile et al. |
| 6,614,781 B1 | 9/2003 | Elliott et al. |
| 6,625,255 B1 | 9/2003 | Green et al. |
| 6,640,239 B1 | 10/2003 | Gidwani |
| 6,643,266 B1 | 11/2003 | Pugaczewski |
| 6,658,052 B2 | 12/2003 | Krinsky et al. |
| 6,667,971 B1 | 12/2003 | Modarressi et al. |
| 6,668,041 B2 | 12/2003 | Kamali et al. |
| 6,674,725 B2 | 12/2003 | Modarressi et al. |
| 6,674,749 B1 | 1/2004 | Mattathil |
| 6,680,940 B1 | 1/2004 | Lewin et al. |
| 6,697,768 B2 | 2/2004 | Jones et al. |
| 6,700,927 B1 | 3/2004 | Esliger et al. |
| 6,724,859 B1 | 4/2004 | Galli |
| 6,728,238 B1 | 4/2004 | Long et al. |
| 6,731,678 B1 | 5/2004 | White et al. |
| 6,735,601 B1 | 5/2004 | Subrahmanyam |
| 6,751,218 B1 | 6/2004 | Hagirahim et al. |
| 6,751,315 B1 | 6/2004 | Liu et al. |
| 6,751,662 B1 | 6/2004 | Natarajan et al. |
| 6,754,283 B1 | 6/2004 | Li |
| 6,762,992 B1 | 7/2004 | Lemieux |
| 6,763,025 B2 | 7/2004 | Leatherbury et al. |
| 6,765,864 B1 | 7/2004 | Natarajan et al. |
| 6,765,918 B1 | 7/2004 | Dixon et al. |
| 6,769,000 B1 | 7/2004 | Akhtar et al. |
| 6,769,024 B1 | 7/2004 | Natarajan et al. |
| 6,771,673 B1 | 8/2004 | Baum et al. |
| 6,775,232 B1 | 8/2004 | Ah Sue et al. |
| 6,775,267 B1 | 8/2004 | Kung et al. |
| 6,775,268 B1 | 8/2004 | Wang et al. |
| 6,775,273 B1 | 8/2004 | Kung et al. |
| 6,778,525 B1 | 8/2004 | Baum et al. |
| 6,782,082 B2 | 8/2004 | Rahamim |
| 6,819,746 B1 * | 11/2004 | Schneider et al. ........ 379/29.01 |
| 6,914,961 B2 * | 7/2005 | Holeva ...................... 379/1.04 |
| 6,985,444 B1 * | 1/2006 | Rosen ........................ 370/241 |
| 7,106,833 B2 * | 9/2006 | Kerpez ..................... 379/1.03 |
| 7,162,011 B2 * | 1/2007 | Kolligs et al. ............. 379/1.04 |
| 2002/0057763 A1 * | 5/2002 | Sisk et al. ................. 379/1.04 |
| 2004/0095921 A1 | 5/2004 | Kerpez |
| 2005/0141673 A1 * | 6/2005 | Lunt et al. .................... 379/22 |

* cited by examiner

AUTOMATED DSL PERFORMANCE ADJUSTMENT

FIELD OF THE DISCLOSURE

The present disclosure relates generally to an automated method of adjusting digital subscriber line (DSL) performance and an automated DSL performance control system.

BACKGROUND OF THE DISCLOSURE

Digital subscriber lines (DSL), such as ADSL lines, are configured to particular profiles based on service agreement, loop quality, and operating environment. A change in these factors, such as introduction of outside electro-magnetic noise, degrades line performance. If the degradation is serious, the line, may become a "problem line" and need a new profile. With a large network, there may be thousands of DSL lines that become problem lines. The typical system to make profile adjustments is to have a service technician manually change the DSL line profile in response to customer complaints received at a volume call center This process may involve one or more truck rolls (sending a service technician to a customer site) which leads to increased DSL maintenance and service costs. It would be desirable to reduce the costs associated with DSL line maintenance while providing improved DSL line performance. Accordingly, there is a need for an improved system and method of adjusting DSL line performance.

DETAILED DESCRIPTION OF THE DRAWINGS

In a particular embodiment, the present application discloses an automated digital subscriber line performance control system comprising a computer system including a logic module to evaluate performance of a plurality of DSL lines and to automatically select a set of DSL lines from the plurality of DSL lines, a line profile database responsive to the computer system, the line profile database providing a plurality of line profiles in response to a request from the computer system, and a digital subscriber line access multiplexer coupled to the computer system. The digital subscriber line access multiplexer is configured to measure a performance parameter of a plurality of physical DSL lines and to change a profile for at least one of the plurality of DSL lines. The set of DSL lines has degraded performance characteristics based on historical performance data.

In another embodiment, an automated method of adjusting digital subscriber line (DSL) performance is disclosed. The method includes evaluating performance of a plurality of DSL lines using a computer based system; automatically selecting a set of DSL lines from the plurality of DSL lines, the set of DSL lines having degraded performance characteristics based on historical performance data accessible with respect to the computer based system; retrieving a plurality of line profiles from a profile database; measuring a performance parameter for each of the set of DSL lines; removing from the set of DSL lines any DSL lines that have suitable performance based on the measured performance parameter to create a revised set of DSL lines with degraded performance; and applying one of the plurality of line profiles to each of the physical DSL lines identified by the revised set of DSL lines.

Figure 1:
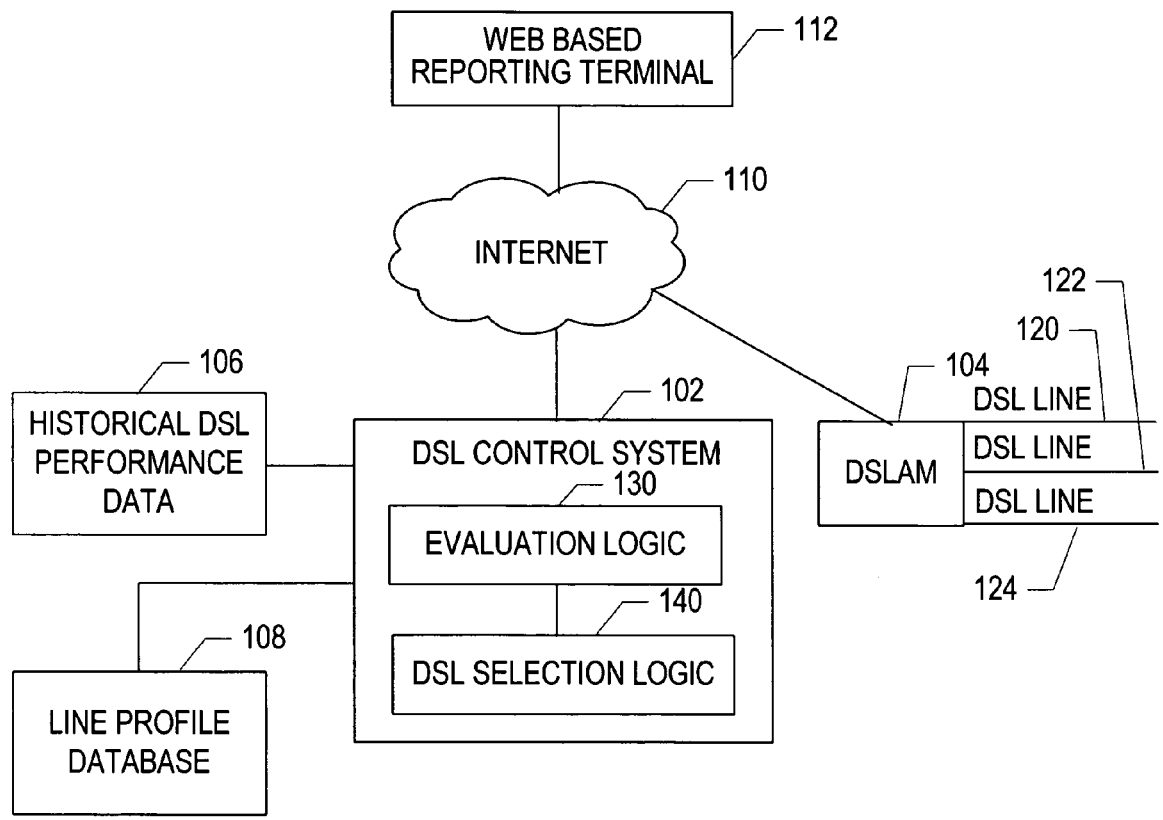
FIG. 1 is a block diagram of a DSL network and a DSL control system.

Referring to FIG. 1, a system in accordance with an embodiment of the present invention is illustrated. The system includes a digital subscriber line (DSL) control system 102, an internet network core 110, and a digital subscriber line access multiplexor (DSLAM) 104. The system also includes a line profile database 108 and a historical DSL performance database 106 coupled to the DSL control system 102. In addition, the system includes a remote web-based reporting terminal 112 coupled to the internet 110. The DSLAM 104 is connected to the internet 110 and connects to a plurality of DSL lines 120 such as illustrated DSL lines 120, 122, and 124. The DSL control system 102 includes evaluation logic 130 and DSL line selection logic 140.

The DSL control system 102 may be implemented as a computer system that includes software to execute the evaluation logic 130 and the DSL selection logic 140. The web-based reporting terminal 112 may be a computer workstation, or personal computer with a display device that includes an input device and a computer processor. An example is a computer workstation that may be operated by a user for viewing reports as to DSL network performance and statistics. The DSL performance database 106 and the line profile database 108 may be implemented with standard computer database technology.

Figure 2:
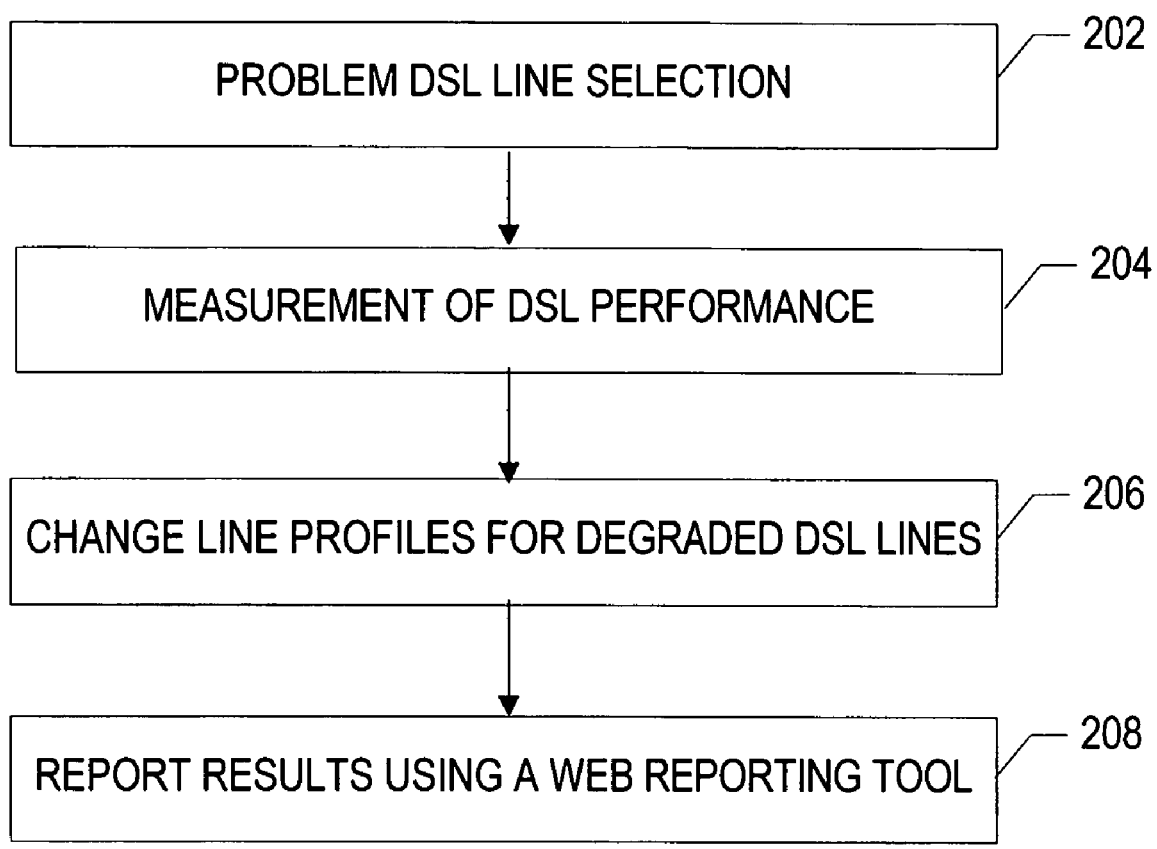
FIG. 2 is a flowchart of an illustrative method of adjusting DSL line performance.

Referring to FIG. 2, operation of the system illustrated in FIG. 1 is described. At step 202, a problem DSL line selection is made. For example, historical DSL performance data for various DSL lines supported by the DSLAM 104 may be evaluated to determine those DSL lines that have reduced performance or performance below a defined performance threshold. In this manner, one or more problem DSL lines may be selected. Selection logic to determine and evaluate the historical DSL performance data may be performed, such as by using the DSL selection logic unit 104 within the DSL control system 102. DSL performance for various lines is measured, at step 204. This step may be performed on all DSL lines or may be performed just on the reduced set of DSL lines that are identified as problem lines. The measurement of DSL performance made on selected problem lines is performed to confirm that the problem DSL line status through an additional measurement.

Line profiles for the degraded DSL lines are changed, at step 206. For example, the DSL lines that were initially selected, at step 202, and then verified as having performance problems at step 204, would have their line profiles changed, at step 206. An example of a changed line profile includes a change to a reduced speed profile or to a channel interleaved profile to assist the performance of the problem DSL line selected. A report of the results of problem DSL lines is provided using a web-reporting tool, at 208. For example, a performance measurement of the DSL line may be taken after the profile has been changed. The performance of selected problem DSL lines may be reported both before and after the profile change. A display report may be reported to an operator, such as via the remote web-based reporting terminal 112. In this matter, an operator of a network may observe performance measurements for problem DSL lines and may observe and evaluate those problem DSL lines before and after a change of profile has been made.

Figure 3:
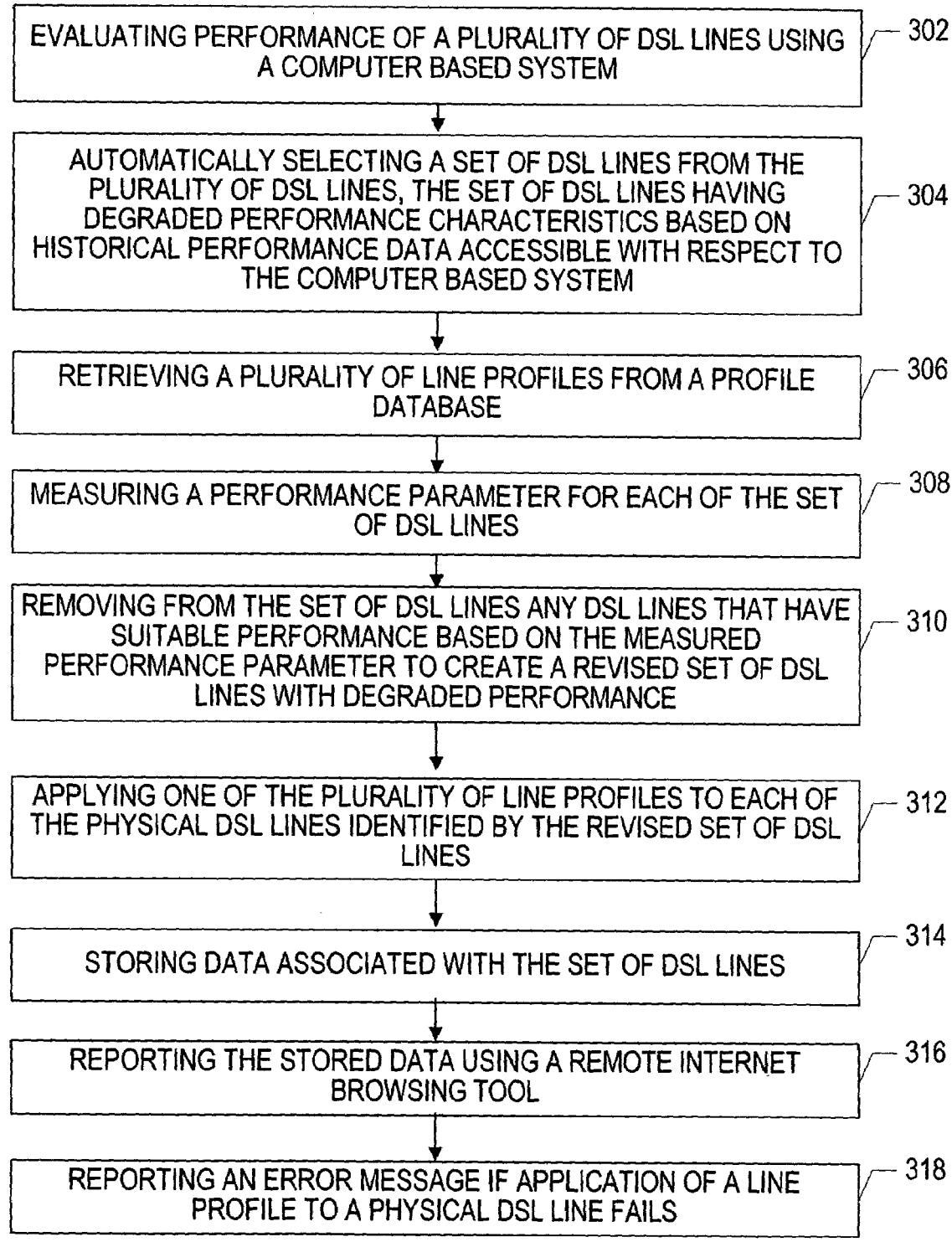
FIG. 3 is a flowchart of a detailed method of adjusting DSL line profiles.

Referring to FIG. 3, a further detailed flow chart that illustrates operation of the system of FIG. 1 is shown. Performance of the plurality of DSL lines is evaluated using a computer-based system, at step 302. An example of such a computer-based system would be the DSL control system 102. The set of DSL lines is automatically selected from a plurality of available DSL lines, at step 304. The set of DSL lines having degraded performance characteristics may be determined based on historical performance data that is accessible to the computer-based system, as shown at step 304. For example, historical DSL performance data 106 may be evaluated by the DSL selection logic 104 within the DSL control system 102, with respect to a set of DSL lines supported by DSLAM 104.

A plurality of line profiles is then retrieved from a profile database, at step 306, and a performance parameter for each of the DSL lines is then measured, at step 308. A subset of DSL lines that have suitable performance based on the measured performance parameter are then removed from the set of degraded DSL lines, at step 310. The result of this step is a revised and reduced size set of DSL lines that have confirmed degraded performance, also shown at step 310. A line profile is then applied to each of the physical DSL lines that are identified by the revised set of DSL lines, at step 312. For example, a reduced speed profile or an interleaved profile would be applied to each of the physical DSL lines that are identified by the revised set of DSL lines, at step 312. Data associated with the revised set of DSL lines is then stored, at step 314. An example of such data would be performance data measured after application of the new line profile to the DSL lines. The stored data is then reported, such as by using a remote internet browsing tool, at step 316. At step 318, an error message is reported if application of the profile to a physical DSL line fails. For example, where a new line profile is attempted to be applied to a physical DSL line and that new line profile is unable to be applied, an error message could be reported at the web-based reporting terminal 112. The error report provides for operator awareness and allows subsequent action to be taken by the operator.

The system and method illustrated with respect to FIGS. 1-3 above, discloses an automated system and may be used with many DSL lines and multiple DSLAM units in a deployed network. With this automated system, thousands of lines may be measured and adjusted automatically, including periodically or on a scheduled basis. With automated adjustments, human intervention is either not needed or, is significantly reduced. The processing time to measure and adjust each DSL line typically uses less than one minute of computer time. The same operation performed by a service technician manually, could take half an hour or longer, depending on the skill of the technician and the complexity of the DSL problem. In addition, using manual service technicians may result in one or more truck rolls adding further cost to DSL maintenance in the network.

The disclosed system utilizes automated methods and provides for improved DSL line performance. In addition, the system removes a significant level of human influence in the process and provides for enhanced performance at a lower cost. Further, line profile adjustment is often a difficult and error prone process and is well-suited to an automated computer control technique as shown.

In addition, with traditional manual methods, only those problem lines identified by customer calls would get attention. In the disclosed system, many problem lines are detected automatically and profiles may be automatically corrected to prevent these problem customer calls. Thus, customer service and DSL line performance is improved while maintenance costs are further reduced. In this manner, not only are customer complaints taken care of expeditiously, but many problems are fixed where neither the company nor the customer have been formally identified, thus, preventing potential subscriber losses. In addition, using a web-based reporting terminal, reports may be generated that include information, such as a list of problem lines selected, lines that fall in the adjustment process, lines that are adjusted successfully, and a line performance matrix that shows performance before and after the line profile has been applied. Thus, a useful reporting tool for network operators is also provided.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An automated method of adjusting digital subscriber line (DSL) performance, the method comprising:
    evaluating a performance of each of a plurality of DSL lines using a computer based system;
    automatically selecting a set of DSL lines from the plurality of DSL lines, the set of DSL lines having degraded performance characteristics based on historical performance data accessible with respect to the computer based system;
    retrieving a plurality of line profiles from a profile database;
    measuring a performance parameter for each of the set of DSL lines;
    removing from the set of DSL lines any DSL lines that have suitable performance based on the measured performance parameter to create a revised set of DSL lines with degraded performance, wherein each DSL line in the revised set of DSL lines is associated with a corresponding physical DSL line; and
    applying one of the plurality of line profiles to each of the physical DSL lines identified by the revised set of DSL lines.

2. The method of claim 1, further comprising storing data associated with the set of DSL lines.

3. The method of claim 2, further comprising reporting the stored data using a remote internet browser reporting tool.

4. The method of claim 3, wherein the data reported includes a list of problem lines selected, a list of lines that fail in the profile application process, an identity of lines that are adjusted, and performance data before and after application of the line profiles to each of the physical DSL lines.

5. The method of claim 1, wherein each of the set of DSL lines is associated with one of the plurality of line profiles before the step of measuring a performance parameter for each of the set of DSL lines.

6. The method of claim 5, wherein at least some of the plurality of line profiles associated with the set of DSL lines are the same line profiles that are applied to each of the physical DSL lines.

7. The method of claim 1, further comprising reporting an error message when one of the DSL lines identified by the revised set of DSL lines does not have suitable performance after applying one of the plurality of line profiles to the corresponding physical DSL line.

8. The method of claim 1, wherein at least one of the plurality of line profiles is an interleaved channel profile.

9. The method of claim 8, wherein a second of the plurality of line profiles is a reduced speed profile.

10. An automated digital subscriber line performance control system comprising:
- a computer system including a logic module to evaluate a performance of each of a plurality of DSL lines and to automatically select a set of DSL lines from the plurality of DSL lines, wherein the set of DSL lines has degraded performance characteristics based on historical performance data;
- a line profile database responsive to the computer system, the line profile database configured to provide a plurality of line profiles in response to a request from the computer system, and
- a digital subscriber line access multiplexer (DSLAM) coupled to the computer system, the DSLAM configured to measure a performance parameter associated with a first physical DSL line of a plurality of physical DSL lines, wherein each DSL line in the set of DSL lines is associated with a corresponding physical DSL line, the DSLAM further configured to apply a line profile selected from the plurality of line profiles to the first physical DSL line.

11. The system of claim 10, further comprising a remote reporting system, the remote reporting system to provide DSL performance data to a user.

12. The system of claim 11, wherein the DSL performance data includes an identification of each of the DSL lines selected, a first set of data for the DSL lines selected, and a second set of data forte DSL lines selected.

13. The system of claim 12, wherein the first set of data is captured before application of the line profile and the second set of data is captured after application of the line profile.

14. The system of claim 10, wherein at least one of the plurality of line profiles is an interleaved channel profile.

15. The system of claim 10, further comprising a display terminal to report stored performance data using a remote internet browser reporting tool.

16. The system of claim 15, wherein the data reported includes a list of problem lines selected, a list of lines that fail in the profile application process, an identity of lines that are adjusted, and performance data before and alter application of the line profiles to each of the physical DSL lines.

17. The system of claim 10, wherein each of the set of DSL lines is associated with one of the plurality of line profiles provided by the line profile database.

18. The system of claim 17, wherein, for each DSL in the set of DSL Lines, a line profile is applied to the corresponding physical DSL line, and wherein at least some of the plurality of line profiles associated with the set of DSL lines are the same line profiles that are applied to each of the physical DSL lines.

19. The system of claim 10, wherein the DSLAM is further configured to apply the line profile when the measured performance parameter indicates that the first physical DSL line has degraded performance characteristics.

20. A method of adjusting digital subscriber line (DSL) performance, the method comprising:
- evaluating a performance of each of a plurality of DSL lines using a computer-based system;
- selecting a set of DSL lines from the plurality of DSL lines, the set of DSL lines having degraded performance characteristics based on historical performance data accessible with respect to the computer-based system;
- retrieving plurality of line profiles from a profile database;
- measuring a performance parameter for each of the set of DSL lines;
- removing, from the set of DSL lines, any DSL line that has a suitable performance based on the corresponding measured performance parameter to create a revised set of DSL lines with degraded performance, wherein each DSL line in the revised set of DSL lines is associated with a corresponding physical DSL line;
- applying a line profile selected from the plurality of line profiles to each of the physical DSL lines identified by the revised set of DSL lines;
- storing data associated with revised the set of DSL lines; and
- reporting the stored data.

21. The method of claim 20, wherein the data reported includes a list of problem lines.

22. The method of claim 21, wherein the data reported further includes a list of lines that do not have suitable performance after applying a corresponding line profile from the plurality of line profiles to each of the physical DSL lines identified by the revised set of DSL lines.

23. The method of claim 22, wherein the data reported further includes performance data before and after applying the corresponding line profile to each of the physical DSL lines identified by the revised set of DSL lines.

* * * * *